(12) United States Patent
Burgess et al.

(10) Patent No.: US 9,988,104 B2
(45) Date of Patent: Jun. 5, 2018

(54) OPERATOR COMPARTMENT STRUCTURE

(71) Applicant: J. C. Bamford Excavators Limited, Uttoxeter, Staffordshire (GB)

(72) Inventors: Jason Burgess, Uttoxeter (GB); Mark Prince, Uttoxeter (GB); Chris Knowles, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 0 days. days.

(21) Appl. No.: 14/788,500

(22) Filed: Jun. 30, 2015

(65) Prior Publication Data

US 2016/0009321 A1    Jan. 14, 2016

(30) Foreign Application Priority Data

Jul. 9, 2014    (GB) .................................... 1412209

(51) Int. Cl.
*B62D 25/06*    (2006.01)
*B62D 33/06*    (2006.01)
*E02F 9/16*    (2006.01)
*B60R 13/08*    (2006.01)

(52) U.S. Cl.
CPC ...... *B62D 33/0604* (2013.01); *B60R 13/0815* (2013.01); *B62D 25/06* (2013.01); *B62D 33/0617* (2013.01); *E02F 9/163* (2013.01)

(58) Field of Classification Search
CPC .......... B62D 33/0604; B62D 33/0617; B62D 25/06; B60R 13/0815; E02F 9/163; B66C 13/54
USPC ................... 296/190.08, 187.13, 193.12, 211
See application file for complete search history.

(56) References Cited

U.S. PATENT DOCUMENTS

| 6,276,750 | B1 * | 8/2001 | Frisch | B62D 33/06 296/190.03 |
| 6,554,351 | B1 * | 4/2003 | El-Zein | B62D 33/06 296/190.08 |
| 7,306,280 | B1 * | 12/2007 | Kraimer | B66F 9/07545 280/756 |
| 7,338,113 | B2 * | 3/2008 | Hiraoka | B60R 21/131 180/89.12 |
| 8,230,957 | B2 | 7/2012 | Braun et al. | |

(Continued)

FOREIGN PATENT DOCUMENTS

DE        197 08 046 C1    6/1998
FR        2 576 862 A1    8/1986

(Continued)

OTHER PUBLICATIONS

Search Report for GB Application No. 1412209.7, dated Jan. 12, 2015.

(Continued)

*Primary Examiner* — Jason S Morrow
*Assistant Examiner* — E Turner Hicks
(74) *Attorney, Agent, or Firm* — Marshall, Gerstein & Borun LLP

(57) ABSTRACT

The present invention provides an operator compartment structure for a working machine. The compartment structure comprises a roof having an inner surface and an outer surface, and a floor spaced apart from the roof. A first section of the inner surface of the roof is orientated at an angle to the floor.

13 Claims, 14 Drawing Sheets

(56) References Cited

U.S. PATENT DOCUMENTS

| | | | |
|---|---|---|---|
| 8,668,255 B1 * | 3/2014 | Randleman | B62D 25/07 296/102 |
| 2007/0205633 A1 * | 9/2007 | Waco | B60H 1/00378 296/190.09 |
| 2009/0108636 A1 * | 4/2009 | Hanson | B62D 33/0625 296/213 |
| 2010/0147603 A1 * | 6/2010 | Davis | B60R 21/131 180/9.46 |

FOREIGN PATENT DOCUMENTS

| | | | | |
|---|---|---|---|---|
| GB | 637275 | * | 5/1950 | |
| GB | 637275 | A | 5/1950 | |
| GB | 2013142 | A | 8/1979 | |
| GB | 2400814 | A * | 10/2004 | B29C 44/1209 |
| GB | 2400814 | A | 10/2004 | |
| JP | 2004042901 | A | 2/2004 | |
| JP | 2010-031579 | A | 2/2010 | |

OTHER PUBLICATIONS

Office Action issued in European Patent Application No. 15 175 676.4, dated May 5, 2017.

* cited by examiner

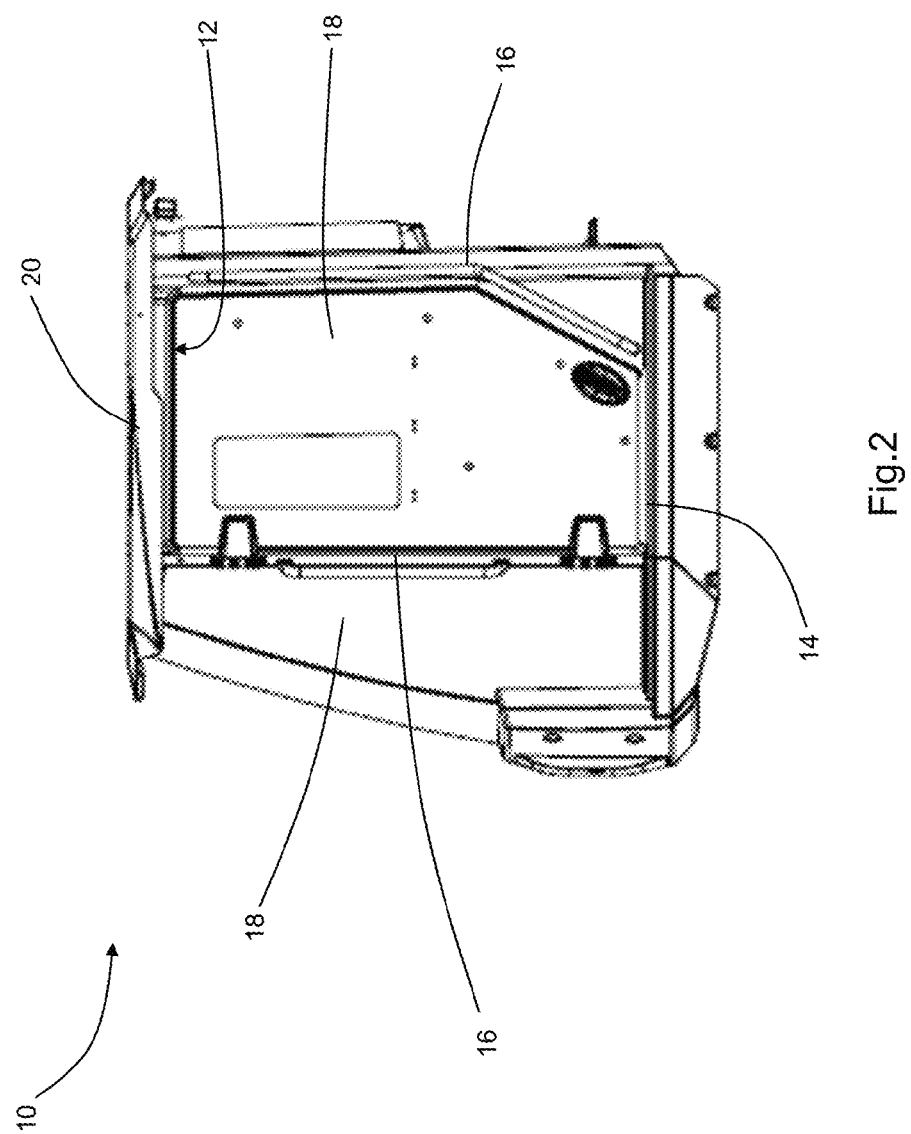

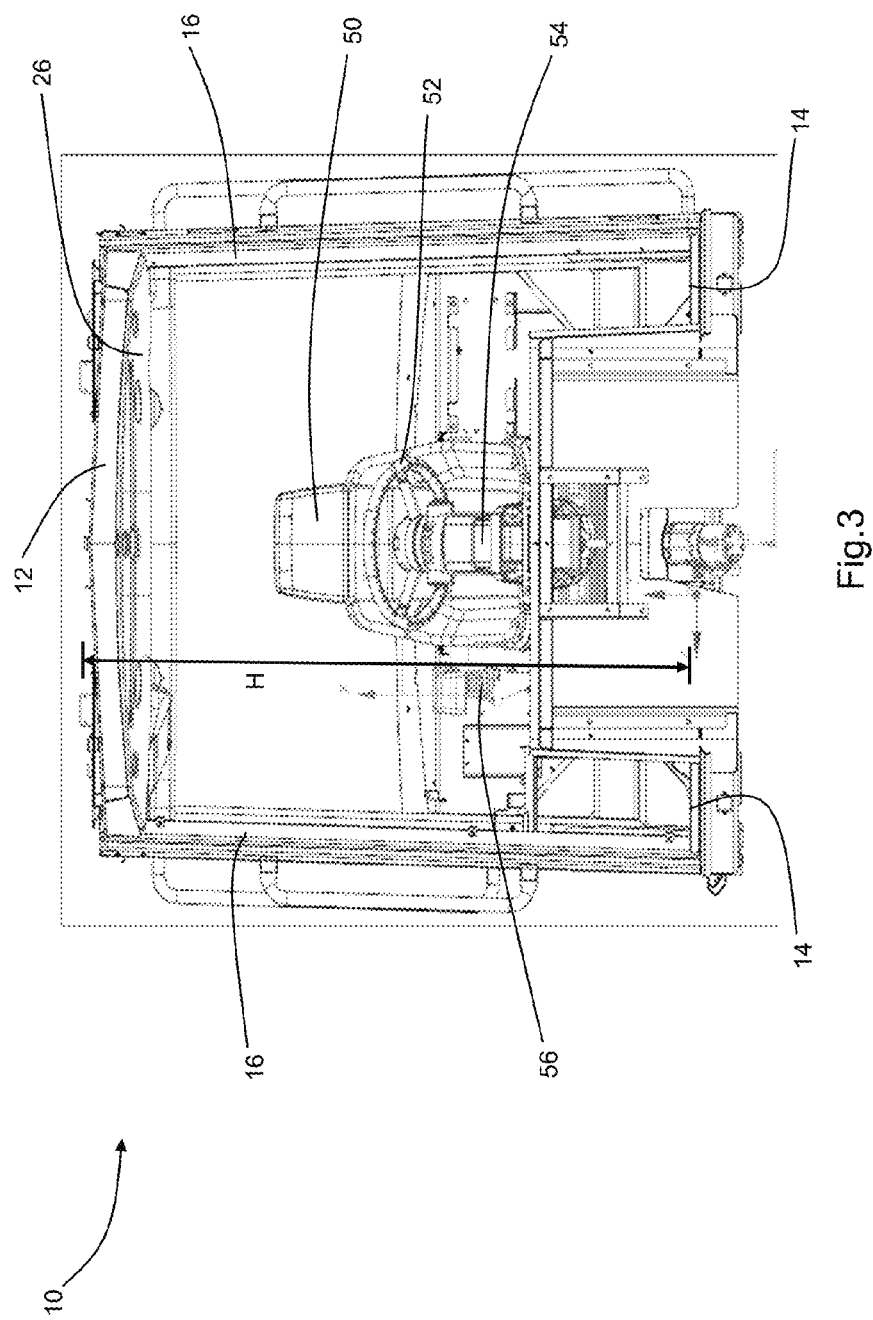

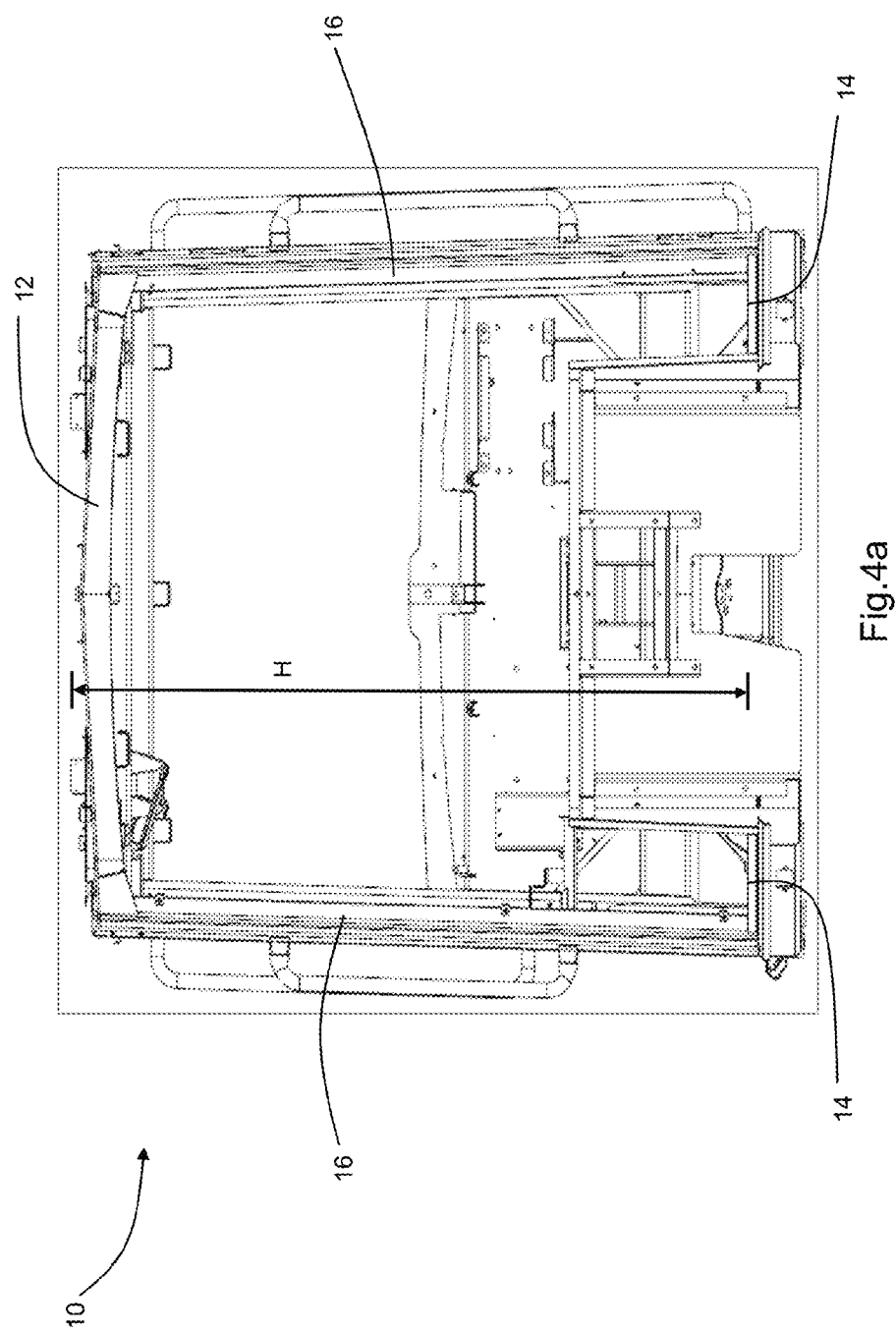

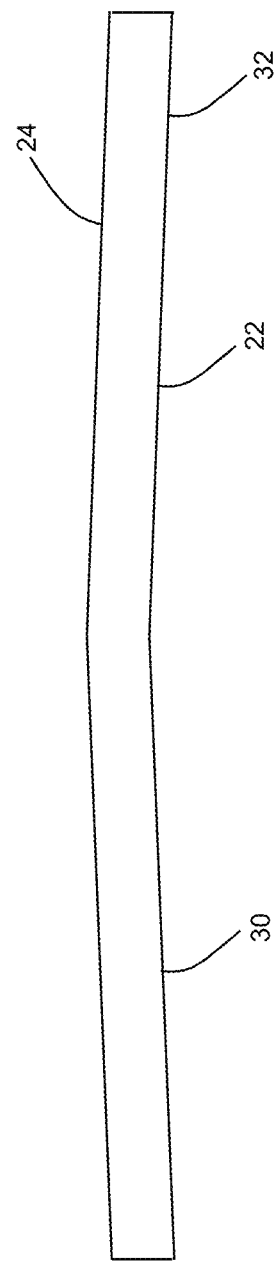
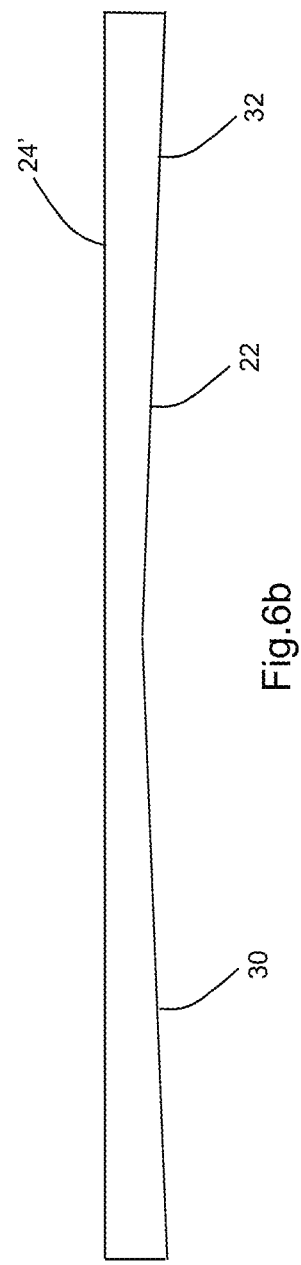
Fig.6a
Fig.6b

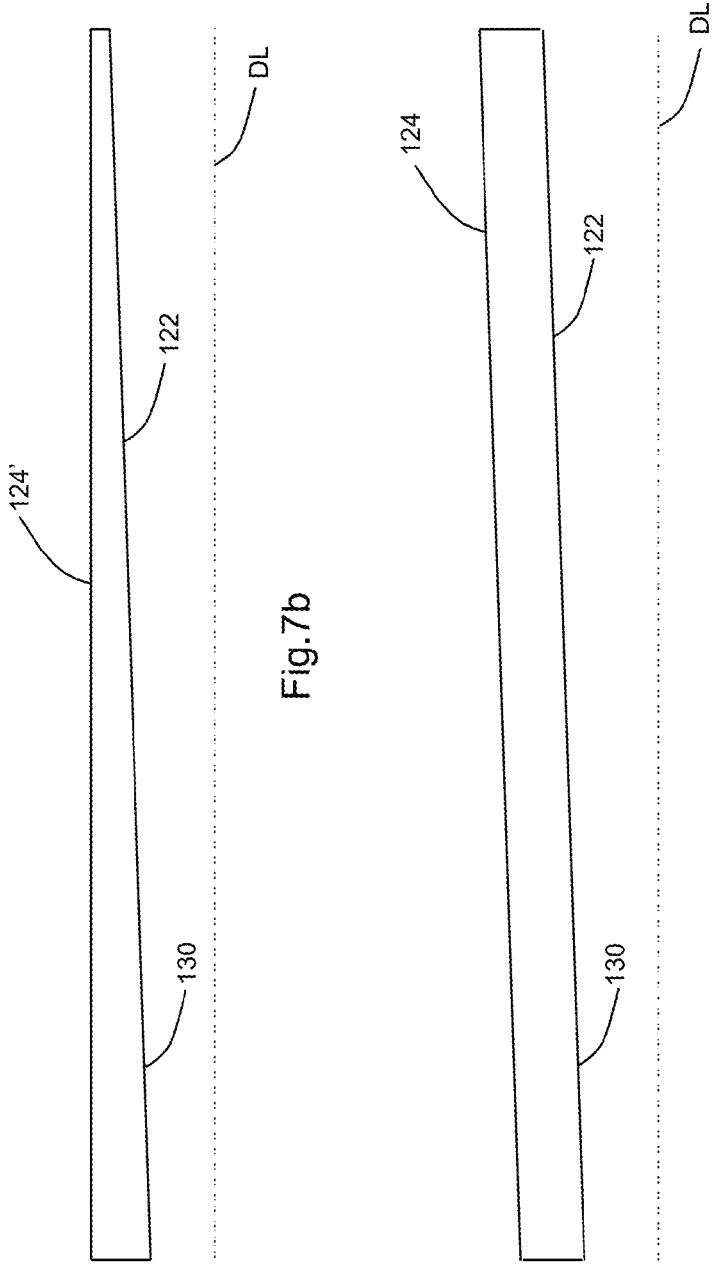

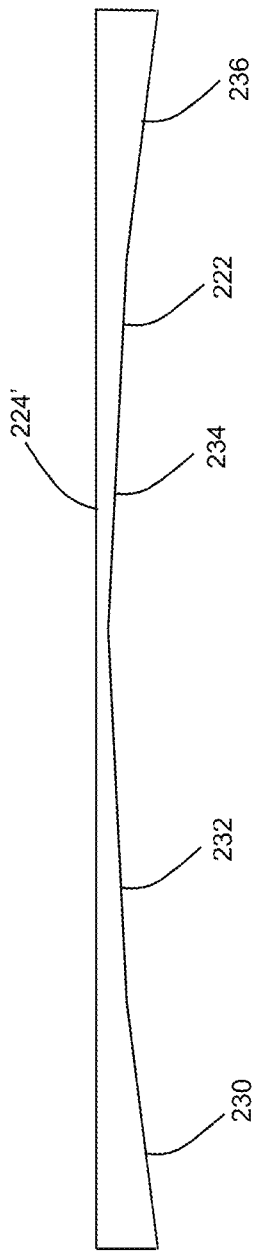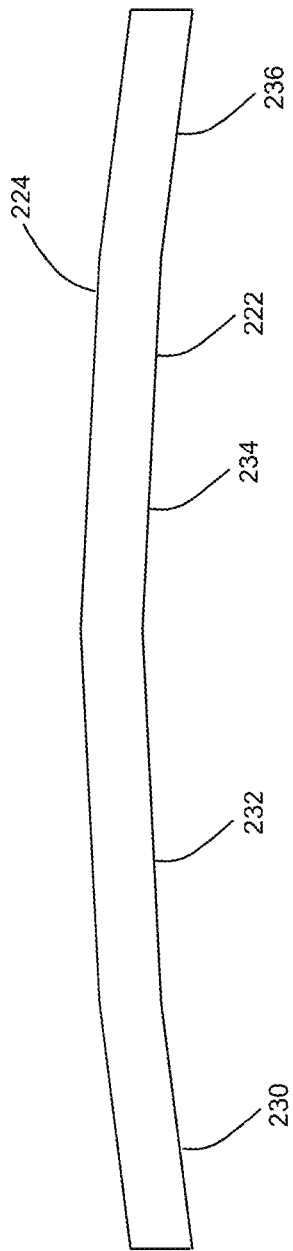

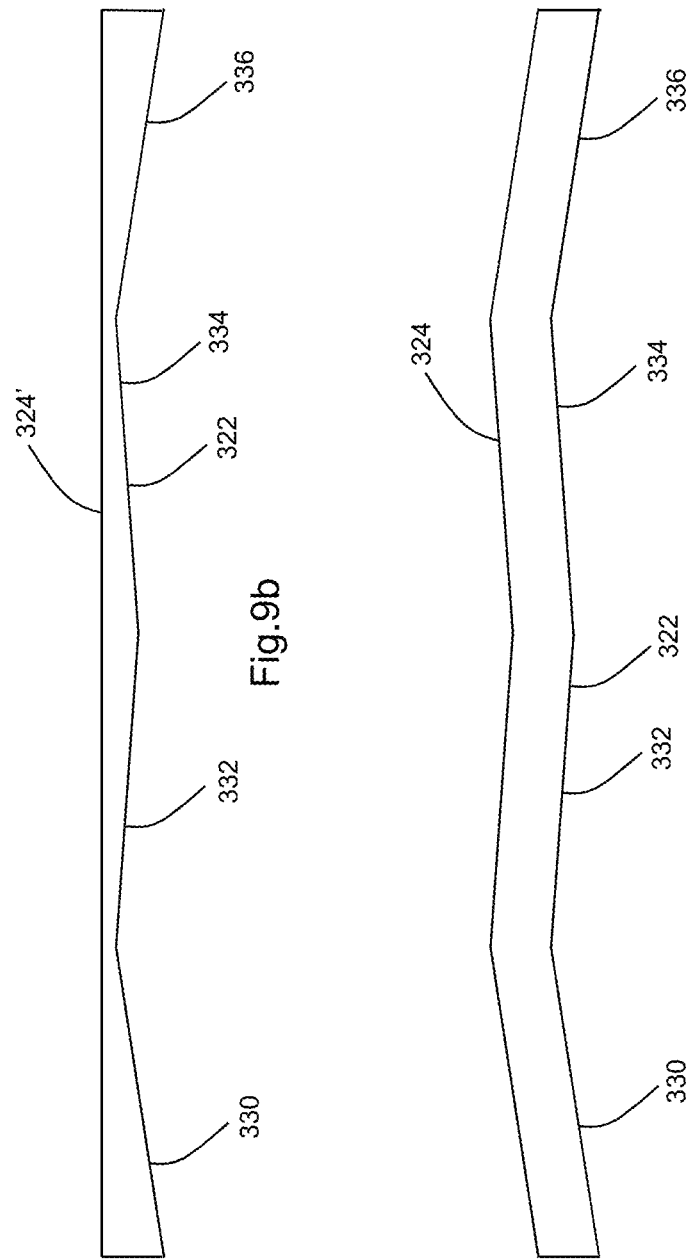

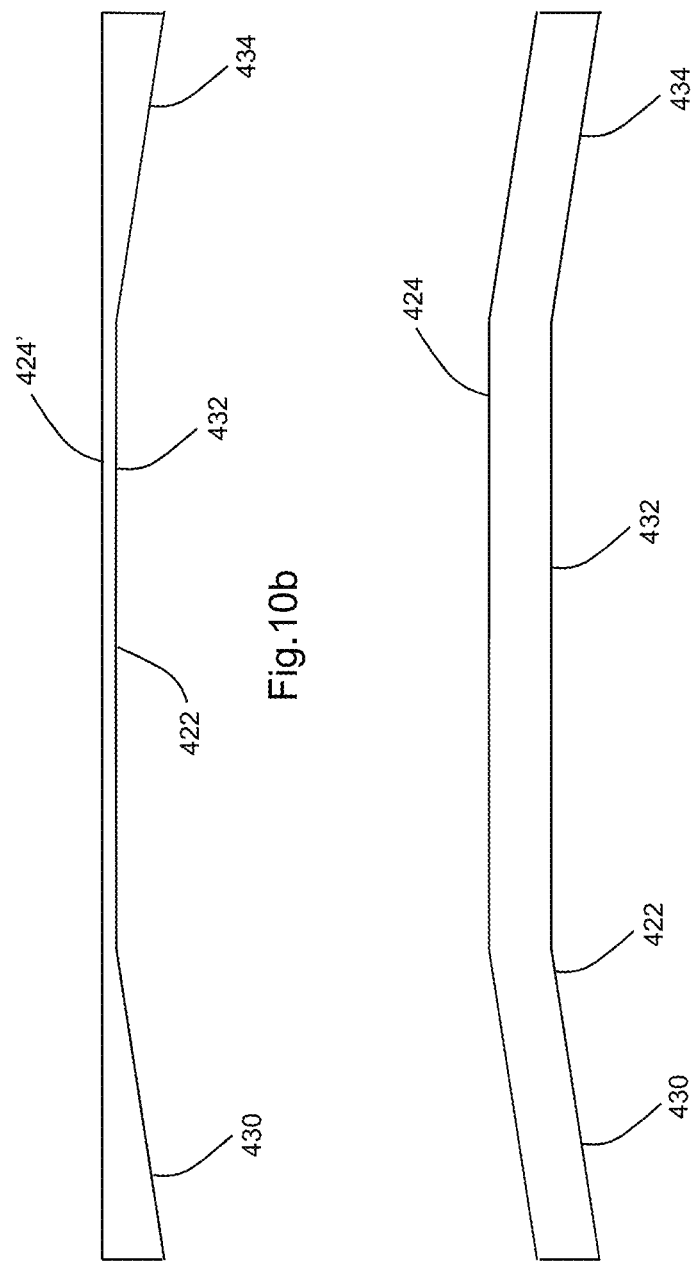

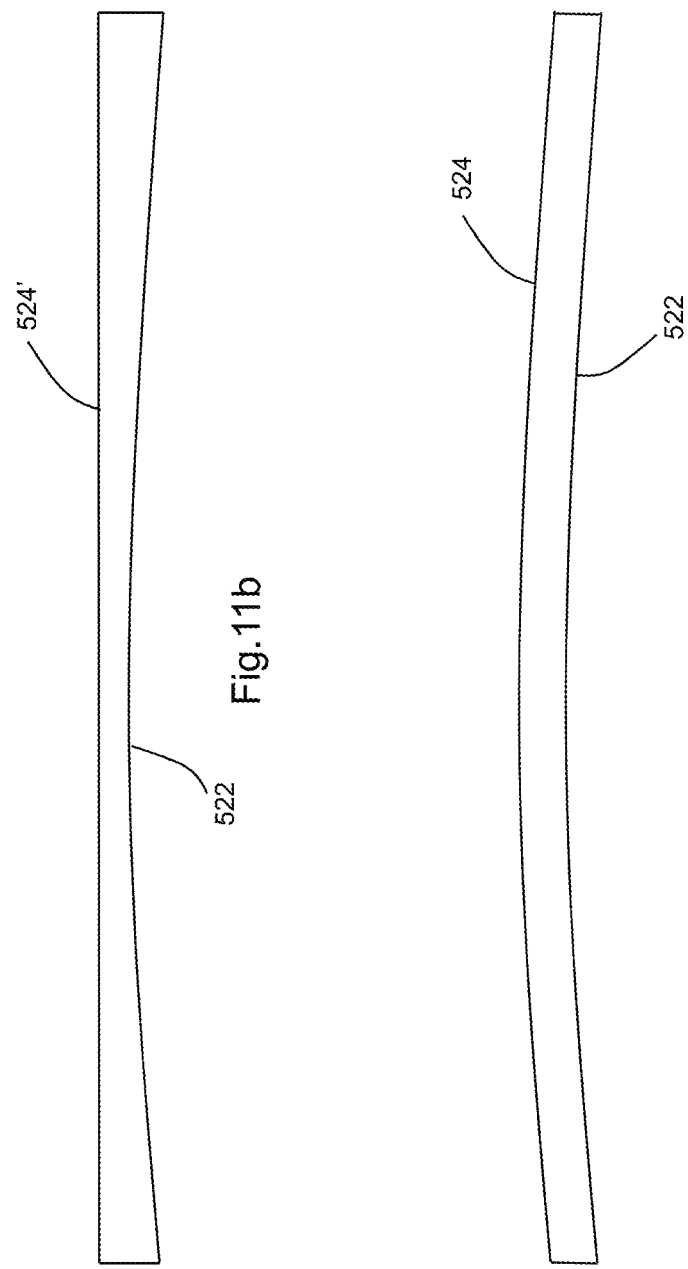

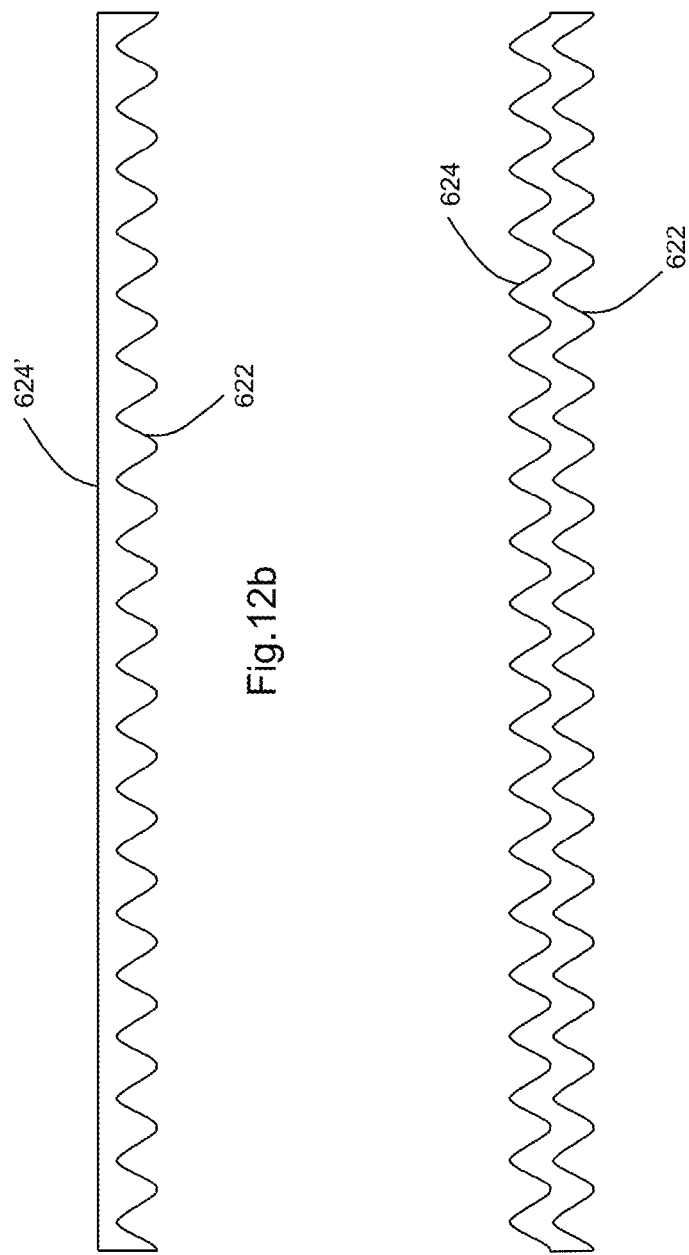

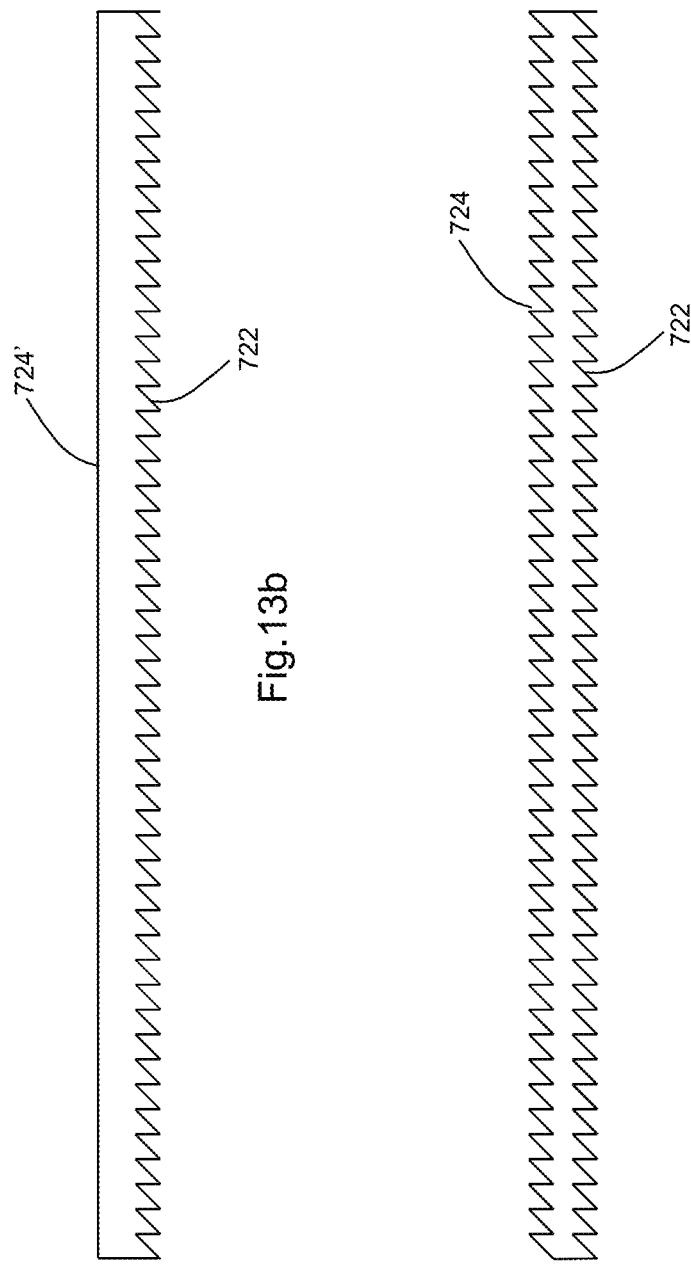

OPERATOR COMPARTMENT STRUCTURE

FIELD OF THE INVENTION

The present invention relates to an operator compartment structure, in particular to an operator compartment structure for a working machine.

BACKGROUND OF THE INVENTION

A working machine generally comprises a working arm and an attachment connected thereto. The working machine may be in the form of a materials handling vehicle such as a loading shovel, telescopic handler, an excavator, a backhoe loader, etc., with an attachment in the form of a shovel, bucket or forks, etc. connected thereto.

The working machine generally also comprises an operator compartment structure, often referred to as a "cab", which is designed to protect a user under certain conditions.

The operator compartment structure may be in the form of a roll over protection structure (ROPS) which is intended to protect a user from injuries caused by the working vehicle overturning or rolling over; in the form of a falling object protective structure (FOPS) which is intended to protect a user from injuries caused by falling objects; or both an ROPS and FOPS compliant structure.

In working machines, the operator compartment structure is generally positioned proximate the engine of the working machine, and as a result the environment within the compartment structure can be quite noisy and become uncomfortable for a user after a prolonged amount of time.

A known way of trying to reduce the noise level within the compartment structure due to engine noise, is by having the compartment structure enclosed by panels in order to reduce the amount of external noise from the engine entering the compartment structure. Depending on the required visibility and direction of visibility by the user, the panels may be see through (transparent), non-see through (non-transparent) or a combination of see through and non-see through panels may be utilized to enclose the compartment structure.

However, increases in the power of an engine may result in an increase in the noise generated, which reduces the effect the panels enclosing the compartment structure have in attenuating the noise heard within the compartment structure.

Increasing the thickness of the panels will help reduce the engine noise heard within the compartment structure but this will have the adverse effect of increasing production costs.

In some cases, it is known to incorporate liners within the compartment structure which are adapted to reduce the amount of engine noise entering the compartment structure.

However, under certain conditions, a standing wave will be generated within the compartment structure which exacerbates the noise within the compartment structure and the liners and/or panels have been shown to have no or limited effect on the issues caused by the generation of a standing wave within the compartment structure.

In addition, additional noise can be generated as a result of vibrations from the engine, causing parts of the compartment structure, such as the roof, to oscillate and generate additional noise within the compartment structure. The use of liners and/or panels have been shown to have no or limited effect in reducing the generation of additional noise within the compartment structure due to vibrations.

It is desirable to provide an operator compartment structure for a working machine which addresses one or more of the problems and disadvantages identified above.

SUMMARY OF THE INVENTION

A first aspect of the invention provides an operator compartment structure for a working machine comprising: a roof having an inner surface and an outer surface; and a floor spaced apart from the roof;
wherein a first section of the inner surface of the roof is orientated at an angle to the floor.

By means of the invention, there is provided an operator compartment structure which reduces the effect of the engine noise within the compartment structure. This is due to the fact that a first section of the inner surface of the roof is orientated at an angle to the floor, which means that the inner surface of the roof and the floor are not fully parallel with one another. As a result, the possibility of a standing wave establishing itself within the compartment structure is significantly reduced as a wave will be reflected back at changing angles of incidence on each surface.

Preferably, the inner surface of the roof comprises at least 50 percent, preferably at least 60 percent, of its surface area at an angle to the floor.

Preferably, a second section of the inner surface of the roof is orientated at an angle to both the first section of the inner surface of the roof and the floor.

In exemplary embodiments, the roof is fabricated.

In exemplary embodiments, the roof comprises a pitched roof configuration.

This has the benefit of adding strength to the roof and will also change the natural frequency of the roof compared to a flat roof configuration. As a result the roof will be less prone to vibrations from the engine causing the roof to oscillate such that it produces additional noise within the compartment structure.

In exemplary embodiments wherein the roof comprises a pitched roof configuration, the roof preferably comprises a pitch angle of between 5 degrees to 15 degrees. The roof may comprise a pitch angle of between 5 degrees to 10 degrees.

In exemplary embodiments, the roof comprises a pitch angel of approximately 7 degrees.

In exemplary embodiments wherein the roof is a fabricated roof, the inner surface of the roof comprises an arcuate configuration.

In exemplary embodiments, the inner surface of the roof comprises a corrugated configuration.

In exemplary embodiments, the inner surface of the roof comprises a saw-tooth configuration.

In exemplary embodiments, the inner surface of the roof comprises a trapezoidal configuration.

In exemplary embodiments, the outer surface of the roof may comprise the same configuration as the inner surface of the roof.

In exemplary embodiments, the roof may comprise a mono-pitch roof configuration.

In exemplary embodiments, the roof may comprise a gambrel roof configuration.

In exemplary embodiments, the roof may comprise a double pitch roof configuration.

In exemplary embodiments, the roof comprises a metallic material. The metallic material may be any suitable metallic material, for example steel.

In exemplary embodiments wherein the roof is a steel roof, the roof may be fabricated from steel sheet, preferably from 5-8 mm thick sheet steel.

In exemplary embodiments, the roof may comprise a glass material.

In exemplary embodiments, the compartment structure may further comprise a roof cover configured to cover the outer surface of the roof. The roof cover may be made from any suitable material, for example a plastics material.

In exemplary embodiments, the compartment structure may further comprise an acoustic roof liner positioned between the inner surface of the roof and the floor. The roof liner may comprise a foam material.

In exemplary embodiments wherein the compartment structure comprises an acoustic roof liner, an air gap is provided between the roof liner and the inner surface of the roof.

The depth of the air gap may be adjustable to have a predetermined spacing between the roof liner and the inner surface of the roof.

The ability to vary the air gap across the compartment structure between the roof liner and the roof has the advantage in that the working absorption frequency band of the roof liner may be varied and/or increased.

In exemplary embodiments, the floor is spaced apart from the roof by a distance of between 1.5 m to 2 m.

The compartment structure in accordance with the first aspect of the invention may be a roll over protection structure and/or a falling object protective structure.

A second aspect of the invention provides a working machine comprising an operator compartment structure according to a first aspect of the invention.

In exemplary embodiments, the working machine comprises a 6 cylinder engine.

BRIEF DESCRIPTION OF THE DRAWINGS

Embodiments of the invention will now be described with reference to the accompanying drawings, in which:

FIG. 2 is a schematic view of an embodiment an operator compartment structure in accordance with the invention;

FIG. 3 is a schematic view from the front of the operator compartment structure of FIG. 2;

FIG. 4a is a schematic view similar to that of FIG. 2 of the operator compartment structure without the internal trimmings and fittings;

FIGS. 6a and 6b are schematic views of the cross-sectional profile of embodiments of the roof with the inner surface of the roof in a first configuration;

FIGS. 7a and 7b are schematic views of the cross-sectional profile of embodiments of the roof with the inner surface of the roof in a second configuration;

FIGS. 8a and 8b are schematic views of the cross-sectional profile of embodiments of the roof with the inner surface of the roof in a third configuration;

FIGS. 9a and 9b are schematic views of the cross-sectional profile of embodiments of the roof with the inner surface of the roof in a fourth configuration;

FIGS. 10a and 10b are schematic views of the cross-sectional profile of embodiments of the roof with the inner surface of the roof in a fifth configuration;

FIGS. 11a and 11b are schematic views of the cross-sectional profile of embodiments of the roof with the inner surface of the roof in a sixth configuration;

FIGS. 12a and 12b are schematic views of the cross-sectional profile of embodiments of the roof with the inner surface of the roof in a seventh configuration; and FIGS. 13a and 13b are schematic views of the cross-sectional profile of embodiments of the roof with the inner surface of the roof in an eight configuration.

DETAILED DESCRIPTION OF EMBODIMENT(S)

The preceding discussion of the background to the invention is intended only to facilitate an understanding of the present invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", mean "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, and compounds described in conjunction with a particular aspect, embodiment or example of the invention are to be understood to be applicable to any other aspect, embodiment or example described herein unless incompatible therewith.

Throughout the description, the term "floor" is used to denote a lower enclosing surface of the operator compartment structure and the term "roof" is used to denote an upper enclosing structure of the operator compartment structure.

Throughout the description, the term "inner" is used in front of another term/feature to denote that the term/feature is situated on the interior side of operator compartment structure and the term "outer" is used in front another term/feature to denote that the term/feature is situated on the exterior side of the operator compartment structure.

Figure 1:
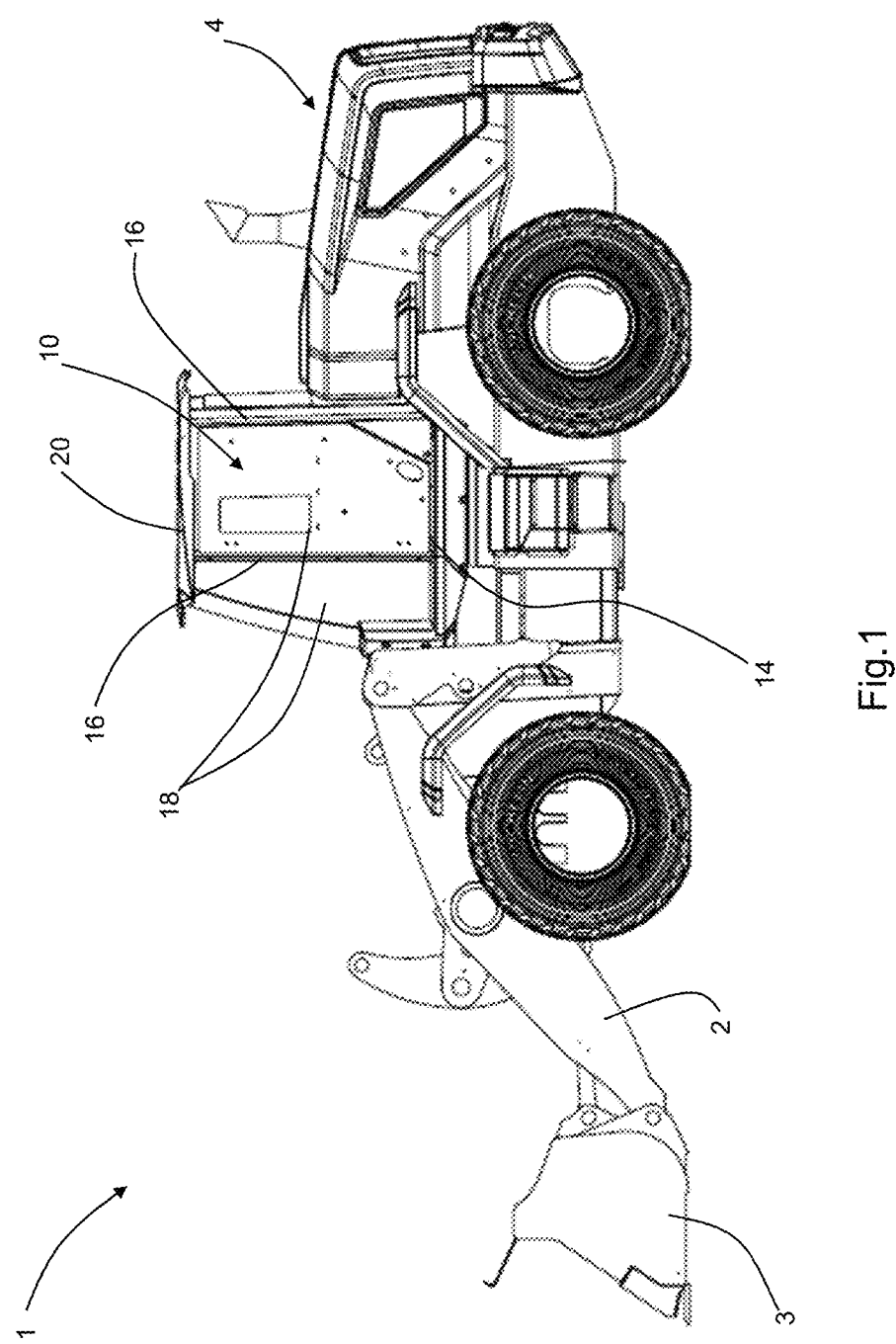
FIG. 1 is a schematic view of a working machine incorporating an operator compartment structure in accordance with the invention.

Referring to FIG. 1, an embodiment of a working machine 1 incorporating an operator compartment structure 10 in accordance with the invention is shown.

The working machine 1 comprises a working arm 2 and an attachment 3 connected thereto. While the working machine 1 is shown in the form of a wheeled loader, it would be understood that the working machine 1 may be of a different type.

The working machine 1 also comprises an engine 4 located proximate the operator compartment structure 10. The engine 4 may be a 4 cylinder or 6 cylinder engine depending on the requirements of the working machine. The engine will typically be operated around 2000-3000 rpm and have a natural frequency of approximately 100 Hz.

Referring to FIGS. 2 to 5, the operator compartment structure 10 (herein after referred to as a "cab") comprises a roof 12 and a floor 14 spaced apart from the roof 12. In the embodiment shown, the floor is spaced apart from the roof by a distance H of between 1.5 m to 2 m. This corresponds to approximately a half-wavelength dimension of the natural frequency of the engine 4. As a result, an uninterrupted sound wave reflected between two parallel surfaces in cab 10 may over a period of time become established into a standing wave. As mentioned above, the establishment of a standing wave within the cab 10 is undesirable.

The roof comprises an inner surface 22 and an outer surface 24. Further details of construction of the roof 12 will be described in more detail later on.

The cab 10 further comprises a plurality of frame structures 16 connecting the roof 12 with the floor 14, and a roof cover 20 configured to cover the outer surface 24 of the roof 12. The roof cover 20 is not shown in FIGS. 3 to 5.

The frame structures 16 are fabricated frame structures. In this context, the term "fabricated" is used to mean constructed or manufactured from prepared components. The fabrication process may involve building the structures by cutting, bending and/or assembling processes as known in the art.

Fabrication of cab structures is used for working machines in order to provide a structure that is sufficiently strong to meet the ROPS and FOPS requirements. For example, thin sheet metal pressings used in passenger and heavy goods vehicles may be unsuitable to meet this requirement. In addition, the volumes in which individual models of working machines are manufactured may make the investment required to produce large pressed components prohibitive.

The roof cover 20 may be manufactured from any suitable material for example a plastics material. The roof cover 20 is designed and configured to give the top exterior of the cab 10 the required aesthetic appeal without compromising the strength or construction of the roof 12.

The frame structures 16 together with the roof 12 and floor 14 define the boundaries of the interior of the cab 10.

As shown in FIG. 2, transparent panels 18 are positioned between the frame structures 16 in order to enclose the interior of the cab 10. The transparent panels 18 may be made from glass or a plastics material. It will be noted that the transparent panels 18 are not shown in FIGS. 3 to 5.

As shown in FIG. 3, positioned within the interior of the cab 10 is the seat 50 for an operator, the steering wheel 52, steering column 54 and joystick assembly 56 arranged to actuate the working arm 2 of the working machine.

An acoustic roof liner 26 is positioned between the inner surface 22 of the roof 12 and the floor 14. The roof liner 26 may comprise any suitable material which dampens noise, for example the roof liner 26 may comprise a foam material.

Figure 4B:
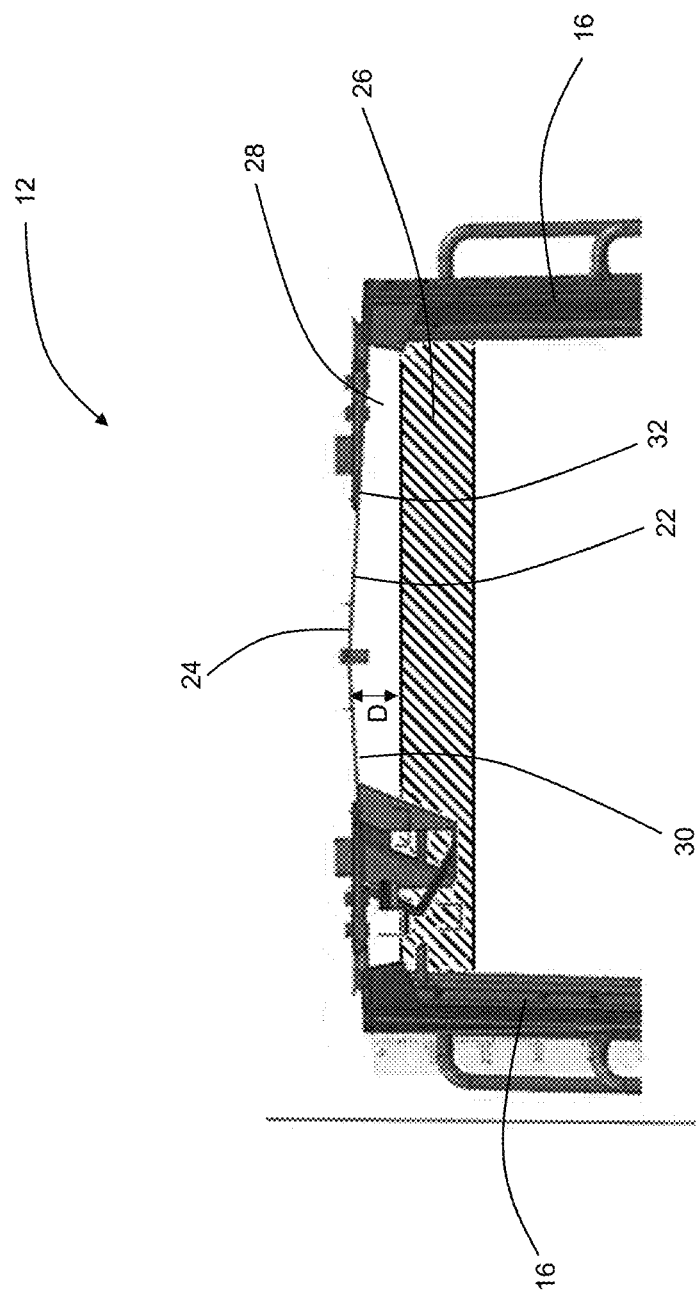
FIG. 4b is a schematic view of the upper section of the operator compartment structure through the center of the compartment structure.
Figure 5:
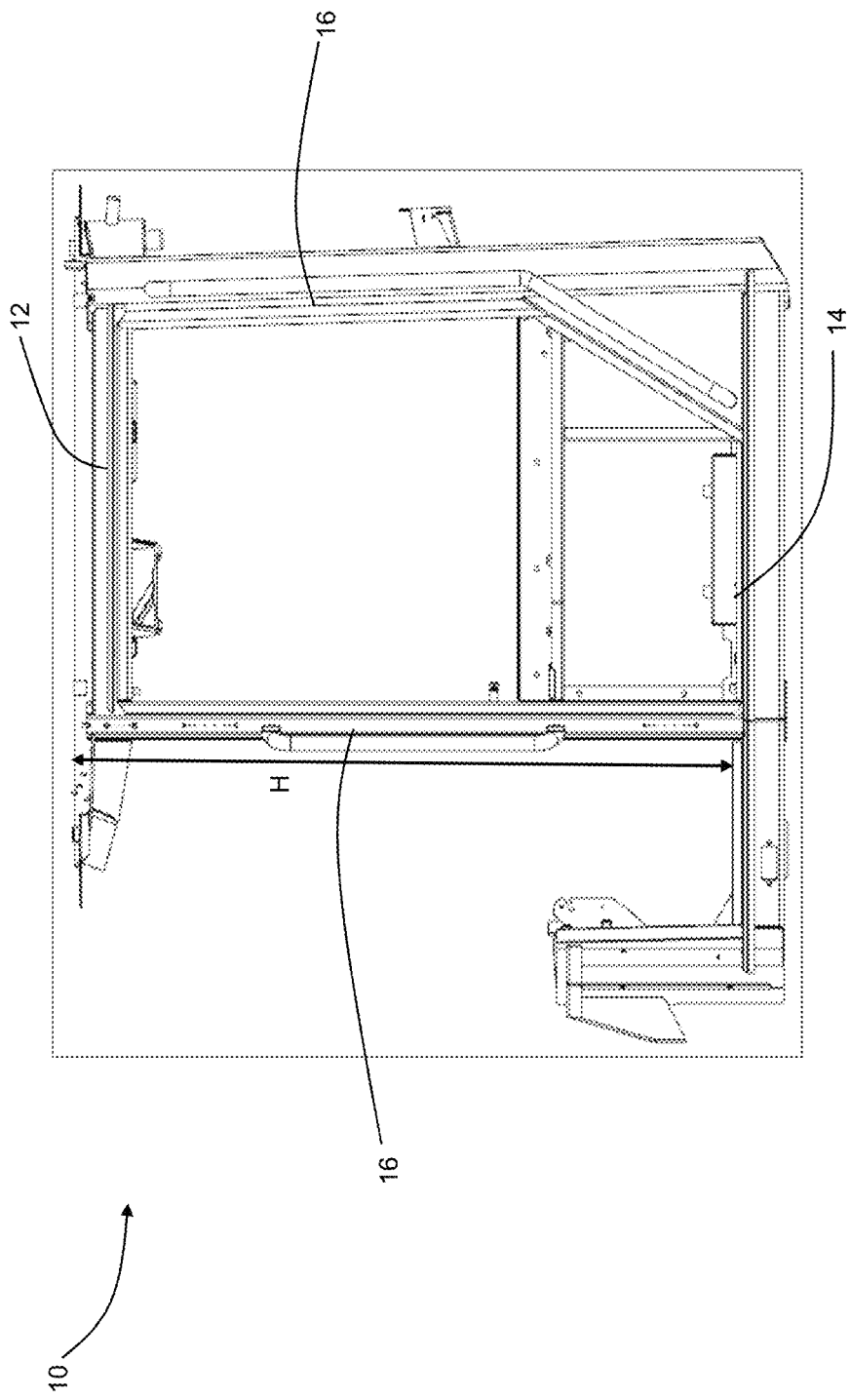
FIG. 5 is schematic view of the structure of FIG. 4 from a first side.

The roof liner 26 is located within the cab 10 such that there is an air gap 28 between the roof liner 26 and the inner surface 22 of the roof 12 (see FIG. 4b).

The position of the roof liner 26 is adjustable at the assembly stage such that the depth D of the air gap 28 is adjustable to have a predetermined spacing between the roof liner 26 and the inner surface 22 of the roof 12. The depth D of the air gap 28 affects the working absorption frequency of the roof liner 26. The depth D of the air gap may be adjusted to a different spacing for each different type of working machine. That is, the depth D may set be at a first spacing for a first working machine (e.g. a backhoe loader) and set at a second spacing for a second working machine (e.g. an excavator). This enables the working absorption frequency band of the roof liner 26 to be tailored to the working machine to which it is fitted. The working absorption frequency band of the roof liner 26 is increased by the ability of the air gap 28 being adjustable.

With particular reference to FIG. 4b, the inner surface 22 of the roof 12 is configured such that a first section 30 of the inner surface 22 of the roof 12 is orientated at an angle to the floor 14. In this way, the first section 30 of the inner surface 22 of the roof 12 will not be fully parallel with the floor 14. This prevents a standing wave becoming established as vertically traveling sound waves will be reflected back at changing angles of incident between the floor 14 and the inner surface 22 of the roof 12.

Due to the fact that the first section 30 of the inner surface 22 of the roof 12 is orientated at an angle to the floor 14, the portion of the air gap 28 between the roof liner 26 and the first section 30 of the inner surface 22 of the roof 12 will have a changing height meaning that the working absorption frequency band of the roof liner 26 underneath the first section 30 of the inner surface 22 of the roof 13 is increased.

In the embodiment shown, the first section 30 of the inner surface 22 defines approximately 50 percent of the inner surface 22.

As can be seen in FIG. 4b, the inner surface 22 of the roof 12 also comprises a second section 32 that is orientated at an angle to both the first section 30 of the inner surface 22 of the roof 12 and the floor 14. In the embodiment shown, the second section 32 of the inner surface defines approximately 50 percent of the inner surface 22.

The first and second sections 30, 32 are orientated so as to be inwardly facing (i.e. facing in a direction towards the center of the cab 10) and as a result give the roof 12 a pitched roof configuration.

The pitched roof configuration adds stiffness to the roof 12 (compared to a prior art flat roof) and as a result, will change the natural frequency of the roof 12. The improved stiffness of the roof 12 means that the natural frequency of the roof 12 is raised moving it above the firing frequencies generated by the engine 4 causing the roof 12 to oscillate such that it produces additional noise within the cab 10. This means that a damping sheet over the roof in order to reduce the vibrational effects as in prior art cab configurations may not be required.

The pitch angle of the roof is configured to be between 5 degrees to 15 degrees, preferably between 5 degrees to 10 degrees. In the embodiment shown, the roof 12 comprises a pitch angle of approximately 7 degrees.

The roof 12 comprises a metallic material, preferably steel and is fabricated from the metallic material.

In the embodiment shown in FIG. 4b, the roof 12 is fabricated from sheet steel, preferably from 5-8 mm thick sheet, ideally 6 mm thick sheet steel. It would be understood that the roof 12 may be produced by a different manufacturing process.

While the roof 12 is shown with the outer surface 24 of the roof 12 having the same configuration as the inner surface 22 of the roof 12, it does not need to be the case and the outer surface 24 of the roof 12 may be of a different configuration to that of the inner surface 22 of the roof 12. For example, the outer surface 24' of the roof 12 may be substantially planar and arranged to be substantially parallel with the floor as shown in FIG. 6b. FIG. 6a shows the roof 12 having a pitched roof configuration as described above for comparison. The cross-sectional views of the roof 12 in FIGS. 6a and 6b are not drawn to scale and are intended to be for illustration purposes only.

In addition, while the first and second sections 30, 32 of the inner surface 22 have been shown to each define approximately 50 percent of the inner surface 22, the percentage ratio defined by the first section 30 may be more or less than 50 percent.

Referring to FIGS. 7a and 7b, embodiments of a roof 112 having an inner surface 122 in accordance with a second configuration are shown. The cross-sectional views of the roof 112 in FIGS. 7a and 7b are not drawn to scale and are intended to be for illustration purposes only.

FIG. 7a shows the roof 112 with the outer surface 124 of the roof 112 having the same configuration as the inner surface 122 of the roof 112. In this configuration, the inner surface 122 of the roof 112 only comprises a first section 130 (defining the whole of the inner surface 122) orientated at an angle to the floor (not shown). This gives the roof 112 a mono-pitch roof configuration. A dashed line DL is shown in phantom in FIG. 7a to indicate a plane parallel to the floor.

FIG. 7b shows an alternative roof 112 configuration wherein the outer surface 124' of the roof 112 is substantially planar, and substantially parallel to the floor, but the inner surface 122 of the roof 112 is orientated at an angle to the floor and having the same configuration as the embodiment shown in FIG. 7a. A dashed line DL is shown in phantom in FIG. 7b to indicate a plane parallel to the floor.

Referring to FIGS. 8a and 8b, embodiments of a roof 212 having an inner surface 222 in accordance with a third configuration are shown. The cross-sectional views of the roof 212 in FIGS. 8a and 8b are not drawn to scale and are intended to be for illustration purposes only.

FIG. 8a shows the roof 212 with the outer surface 224 of the roof 212 having the same configuration as the inner surface 222 of the roof 212. In this configuration, the inner surface 222 of the roof 212 comprises a first section 230, a second section 232, a third section 234 and a fourth section 236. The four sections 230,232,234,236 of the inner surface 222 of the roof 212 are each orientated at an angle to each other and to the floor (not shown). All four sections 230, 232,234,236 of the inner surface of the roof 212 are orientated so as to be inwardly facing and as a result give the roof 212 a gambrel roof configuration.

FIG. 8b shows an alternative roof 212 configuration wherein the outer surface 224' of the roof 212 is substantially planar, and substantially parallel to the floor, but the inner surface 222 of the roof 212 has the same configuration as the embodiment shown in FIG. 8a.

Referring to FIGS. 9a and 9b, embodiments of a roof 312 having an inner surface 322 in accordance with a fourth configuration are shown. The cross-sectional views of the roof 312 in FIGS. 9a and 9b are not drawn to scale and are intended to be for illustration purposes only.

FIG. 9a shows the roof 312 with the outer surface 324 of the roof 312 having the same configuration as the inner surface 322 of the roof 312. In this configuration, the inner surface 322 of the roof 312 comprises a first section 330, a second section 332, a third section 334 and a fourth section 336. The four sections 330,332,334,336 of the inner surface 322 of the roof 312 are each orientated at an angle to each other and to the floor (not shown). In this configuration, the first and fourth sections 330,336 of the inner surface 322 of the roof 312 are orientated to be inwardly facing, while the second and third sections 332,334 are orientated to be outwardly facing (i.e. facing in a direction away from the center of the cab 10). This gives the roof 312 a double pitch roof configuration.

FIG. 9b shows an alternative roof 312 configuration wherein the outer surface 324' of the roof 312 is substantially planar, and substantially parallel to the floor, but the inner surface 322 of the roof 312 has the same configuration as the embodiment shown in FIG. 9a.

Referring to FIGS. 10a and 10b, embodiments of a roof 412 having an inner surface 422 in accordance with a fifth configuration are shown. The cross-sectional views of the roof 412 in FIGS. 10a and 10b are not drawn to scale and are intended to be for illustration purposes only.

FIG. 10a shows the roof 412 with the outer surface 424 of the roof 412 having the same configuration as the inner surface 422 of the roof 412. In this configuration, the inner surface 422 of the roof 412 comprises a first section 430, a second section 432 and a third section 434. The three sections 430,432,434 of the inner surface 422 of the roof 412 are each orientated at an angle to each other. In this configuration, the first and third sections 430,434 of the inner surface 422 of the roof 412 are orientated to be inwardly facing, while the second section 332 is orientated to be substantially parallel with the floor (not shown). This gives the roof 412 a trapezoidal roof configuration.

The first and third sections 430,434 of the inner surface 422 of the roof 412 define at least 50 percent, preferably at least 60 percent, but less than 95 percent of the inner surface 422. The first and third sections 430,434 may define the same percentage of the inner surface 422 of the roof 412 or respectively define different percentages of the inner surface 422 of the roof 412.

FIG. 10b shows an alternative roof 412 configuration wherein the outer surface 424' of the roof 412 is substantially planar, and substantially parallel to the floor, but the inner surface 422 of the roof 412 has the same configuration as the embodiment shown in FIG. 10a.

Referring to FIGS. 11a and 11b, embodiments of a roof 512 having an inner surface 522 in accordance with a sixth configuration are shown. The cross-sectional views of the roof 512 in FIGS. 11a and 11b are not drawn to scale and are intended to be for illustration purposes only.

FIG. 11a shows the roof 512 with the outer surface 524 of the roof 512 having the same configuration as the inner surface 522 of the roof 512. In this configuration, the inner surface 522 of the roof 512 comprises an arcuate configuration. As a result a plurality of sections of the inner surface 522 of the roof 512 will be orientated at an angle to the floor (not shown).

FIG. 11b shows an alternative roof 512 configuration wherein the outer surface 524' of the roof 512 is substantially planar, and substantially parallel to the floor, but the inner surface 522 of the roof 512 having the same configuration as the embodiment shown in FIG. 11a.

Referring to FIGS. 12a and 12b, embodiments of a roof 612 having an inner surface 622 in accordance with a seventh configuration are shown. The cross-sectional views of the roof 612 in FIGS. 12a and 12b are not drawn to scale and are intended to be for illustration purposes only.

FIG. 12a shows the roof 612 with the outer surface 624 of the roof 612 having the same configuration as the inner surface 622 of the roof 612. In this configuration, the inner surface 622 of the roof 612 comprises a corrugated configuration. As can be seen, the profile of the inner surface 622 alternates regularly between a fixed minimum and maximum height. As a result a plurality of sections of the inner surface 622 of the roof 612 will be orientated at an angle to the floor (not shown).

FIG. 12b shows an alternative roof 612 configuration wherein the outer surface 624' of the roof 612 is substantially planar, and substantially parallel to the floor, but the inner surface 622 of the roof 612 having the same configuration as the embodiment shown in FIG. 12a.

While the corrugated profile of the inner surface 622 and the outer surface 624 has been shown in the form of a sine wave profile, it would be understood that it may be in the form of an alternate profile. For example, the corrugated profile may be in the form of a square wave profile, a triangle wave profile or a trapezoidal wave profile.

Referring to FIGS. 13a and 13b, embodiments of a roof 712 having an inner surface 722 in accordance with an eighth configuration are shown. The cross-sectional views of the roof 712 in FIGS. 13a and 13b are not drawn to scale and are intended to be for illustration purposes only.

FIG. 13a shows the roof 712 with the outer surface 724 of the roof 712 having the same configuration as the inner surface 722 of the roof 712. In this configuration, the inner surface 722 of the roof 712 comprises a saw-tooth configuration. In the embodiment shown, the profile of the inner surface 722 repeatedly ramps upward to a fixed maximum height and then sharply drops to a fixed minimum height. As a result a plurality of sections of the inner surface 722 of the roof 712 will be orientated at an angle to the floor (not shown).

FIG. 13b shows an alternative roof 712 configuration wherein the outer surface 724' of the roof 712 is substantially planar, and substantially parallel to the floor, but the inner surface 722 of the roof 712 having the same configuration as the embodiment shown in FIG. 13a.

The cab 10 is configured to be a roll over protection structure and/or falling object protective structure and compliant with the relevant ROPS and/or FOPS legislations/regulations.

While a number of different inner roof configurations have been described above, alternative configurations wherein at least a first section of the inner surface is orientated at an angle to (i.e. not parallel with) the floor are possible and the above described embodiments are not intended to provide an exhaustive list of possible inner surface configurations. The inner surface of the roof should have at least 50 percent, if possible 100 percent, of its surface area at an angle to the floor.

While the roof has been described as comprising a metallic material, it should be understood that the roof may comprise a different material, for example a glass material or composite material (e.g. carbon fiber). The roof may also be constructed so as to be formed to comprise a partially metallic material and a partially glass material.

Although the invention has been described above with reference to one or more preferred embodiments, it will be appreciated that various changes or modifications may be made without departing from the scope of the invention as defined in the appended claims. For example, the above described embodiments the roofs are all angled relative to the floor in a transverse (left-right) direction of the cab, whereas the angle may be relative to the floor in a fore-aft direction.

Whilst it is conceivable the roof may also be angled in both transverse and fore-aft directions (e.g. by being a pyramid shape), this is not preferred due to the difficulty of forming a sheet of a metal such as steel into a shape of this format.

In addition, the invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An operator compartment structure for a working machine comprising:
   a roof having an inner surface and an outer surface;
   a floor spaced apart from the inner surface of the roof by a distance of 1.5 m to 2.0 m; and
   an acoustic roof liner positioned below the inner surface of the roof and between the inner surface of the roof and the floor;
   wherein a first section of the inner surface of the roof is orientated at a non-zero angle relative to the floor, and further wherein an air gap is provided between the acoustic roof liner and the inner surface of the roof, and wherein the air gap between the acoustic roof liner and the first section of the inner surface of the roof has a changing depth.

2. A compartment structure as claimed in claim 1, wherein the inner surface of the roof includes a second section, and wherein at least 50 percent of an area of the inner surface of the roof is oriented at the non-zero angle relative to the floor, and wherein the second section of the inner surface of the roof is oriented at the non-zero angle relative to both the first section of the inner surface of the roof and the floor.

3. A working machine comprising:
   a 4-cylinder or a 6-cylinder engine;
   a working arm; and
   an operator compartment structure comprising:
   a roof having an inner surface and an outer surface; and
   a floor spaced apart from the inner surface of the roof by a distance of between 1.5 m and 2 m;
   wherein a first section of the inner surface of the roof is orientated at a first non-zero angle to the floor;
   wherein a second section of the inner surface of the roof is also orientated at a second non-zero angle to the floor and to the first section of the inner surface of the roof; and
   wherein the first and second sections of the inner surface of the roof each define approximately 50 percent of the inner surface of the roof.

4. The working machine according to claim 3, further comprising an acoustic roof liner positioned between the inner surface of the roof and the floor.

5. The working machine according to claim 4, wherein an air gap is provided below the inner surface of the roof and between the roof liner and the inner surface of the roof.

6. The working machine according to claim 3, wherein the roof comprises a pitched roof configuration.

7. The working machine according to claim 3, wherein the roof comprises a double pitch roof configuration.

8. The working machine according to claim 3, wherein the roof comprises a metallic material.

9. The working machine according to claim 8, wherein the roof is a steel roof.

10. The working machine according to claim 3, further comprising a roof cover configured to cover the outer surface of the roof, and wherein the roof cover comprises a plastics material.

11. The working machine according to claim 4, wherein the roof liner comprises a foam material.

12. The working machine according to claim 5, wherein the portion of the air gap between the roof liner and the first section of the inner surface of the roof has a changing height.

13. The working machine according to claim 3, wherein all of the first section of the inner surface of the roof is orientated at the first non-zero angle to the floor, and all of the second section of the inner surface of the roof is orientated at the second non-zero angle to the floor and to the first section of the inner surface of the roof.

* * * * *